United States Patent [19]
Kobayashi et al.

[11] Patent Number: 5,182,699
[45] Date of Patent: Jan. 26, 1993

[54] PORTABLE ELECTRONIC APPARATUS HAVING AN INTERCHANGEABLE DETACHABLE BATTERY AND OPTIONAL COMPONENT FOR EXPANDING A FUNCTION

[75] Inventors: Takaichi Kobayashi; Mitsuhiro Yoshida, both of Tokyo, Japan

[73] Assignee: Kabushiki Kaisha Toshiba, Kawasaki, Japan

[21] Appl. No.: 717,609

[22] Filed: Jun. 21, 1991

[30] Foreign Application Priority Data

Jun. 25, 1990 [JP] Japan .................. 2-166219

[51] Int. Cl.⁵ .................. H05K 5/02; H05K 7/10; G06F 1/16
[52] U.S. Cl. .................. 361/395; 361/380
[58] Field of Search .................. 364/708; 361/380, 390, 361/391, 392, 393, 394, 395, 399

[56] References Cited

U.S. PATENT DOCUMENTS

| | | | |
|---|---|---|---|
| 4,680,674 | 7/1987 | Moore | 364/708 X |
| 4,745,524 | 5/1988 | Patton, III | 364/708 X |
| 4,924,355 | 5/1990 | Mitchell et al. | 364/708 X |
| 4,991,058 | 2/1991 | Watkins et al. | 364/708 X |
| 5,058,045 | 10/1991 | Ma | 364/708 |

FOREIGN PATENT DOCUMENTS

| | | |
|---|---|---|
| 0355203 | 2/1990 | European Pat. Off. . |
| 0404164 | 12/1990 | European Pat. Off. . |
| 89094905 | 12/1989 | Fed. Rep. of Germany . |
| 90116534 | 11/1990 | Fed. Rep. of Germany . |
| 64-54369 | 4/1989 | Japan . |

OTHER PUBLICATIONS

Shima Takeaki; "Connector For Cell"; Patent Abstracts of Japan vol. 012-367; Nov. 7, 1986.
Toshiba T1600 Portable Personal Computer User's Manual.

*Primary Examiner*—Leo P. Picard
*Assistant Examiner*—Michael W. Phillips
*Attorney, Agent, or Firm*—Cushman, Darby & Cushman

[57] ABSTRACT

A portable computer comprises a base unit to which a keyboard and a display unit are attached. First and second batteries, functioning as a drive power source, and are attached to the base unit. An optional component may be attached to the base unit in place of the second battery. The optional component, for example, can be a modem device to be connected to a telephone line or an additional memory unit. In the base unit, there is formed a first mounting recess to which the first battery is detachably attached, and a second mounting recess to which the second battery or the optional component is selectively detachably attached.

7 Claims, 8 Drawing Sheets

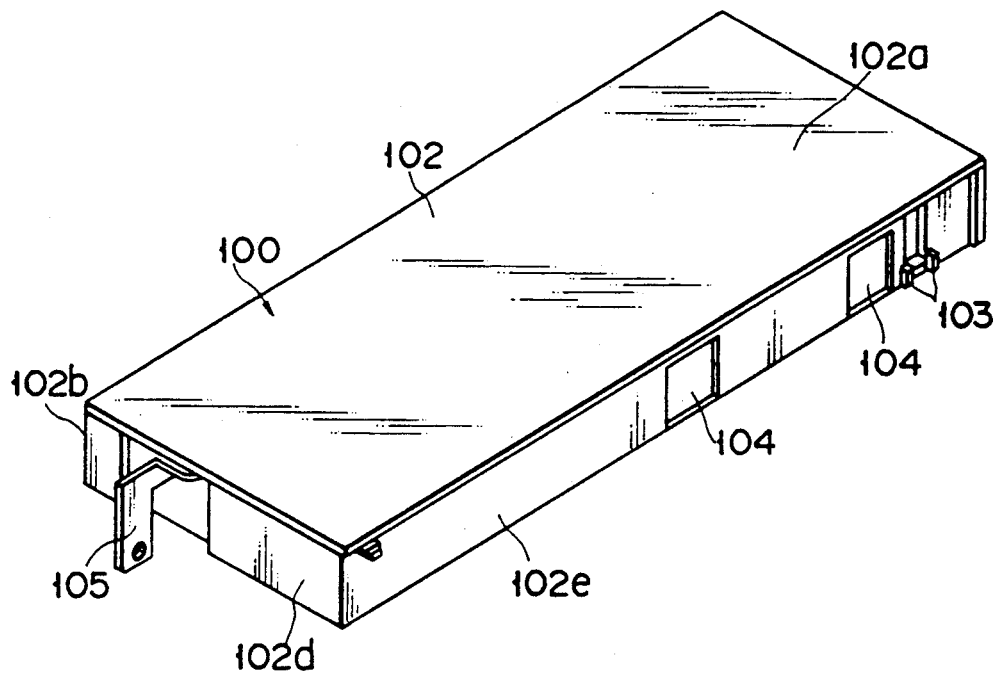
F I G. 7
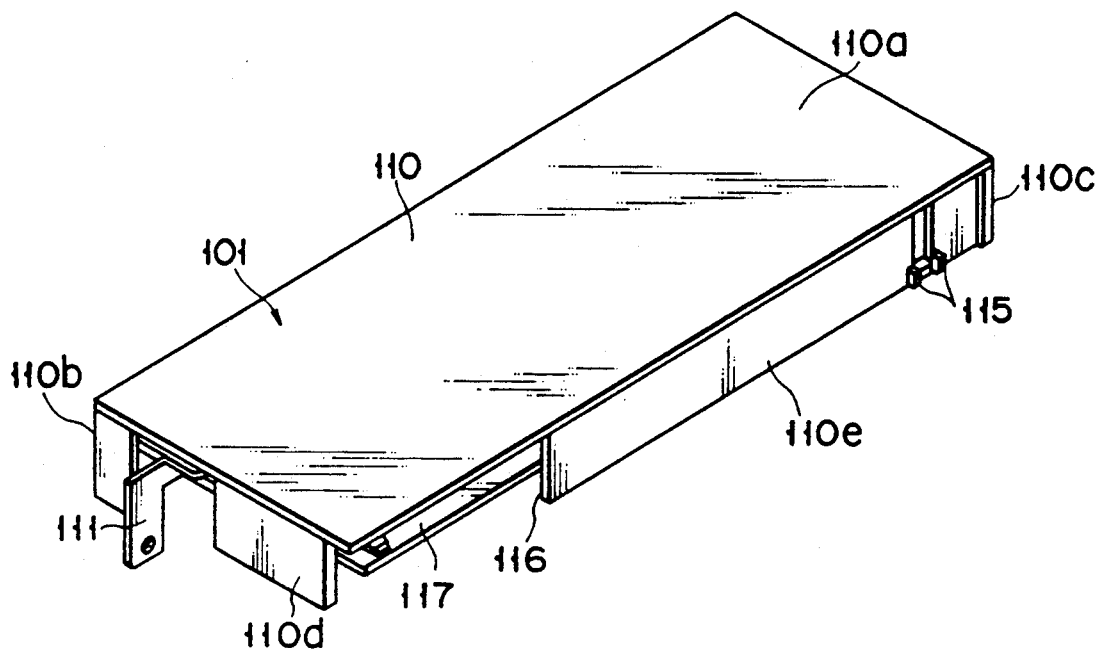
F I G. 8

PORTABLE ELECTRONIC APPARATUS HAVING AN INTERCHANGEABLE DETACHABLE BATTERY AND OPTIONAL COMPONENT FOR EXPANDING A FUNCTION

BACKGROUND OF THE INVENTION

1. Field of the Invention

The present invention relates to a portable electronic apparatus such as a lap-top type computer or a word processor, and more particularly to the structure for attaching a battery functioning as a drive power source and an optional component such as a modem to be connected to a telephone line.

2. Description of the Related Art

In recent years, there are widely used a lap-top type portable computer having a keyboard and a flat panel type display unit and a word processor.

This type of the lap-top portable electronic apparatus has a battery functioning as a drive power source. The battery is incorporated into a base unit supporting a keyboard and a display unit. It is required that the battery be detached from the base unit when being charged. For this reason, in the conventional apparatus, there is formed a first receiving recess for receiving the battery into the rear portion of the base unit, and the battery is detachably attached to the first receiving recess.

Even in such an apparatus, there is used the structure in which the optional component such as a modem to be connected to a telephone line as required. U.S. patent application Ser. No. 07/542,041 filed June 6, 1990 discloses an apparatus, which has a second receiving recess for receiving the optional component into the rear portion of the base unit. The second receiving recess is arranged in parallel to be adjacent to the first receiving recess for receiving the battery. The second receiving recess of the base unit is covered with a cover other than the time when the apparatus is used in a state that the optional component is connected thereto. The cover is detachably attached to the base unit. In a state that the cover is attached to the base unit, the outer surface of the cover is formed in series to be flush with the outer surface of the base unit, and the cover itself constitutes a part of the base unit.

According to the above conventional apparatus, since the optional component is detached from the second receiving recess when the optional component is unnecessary, the second receiving recess was simply covered with the cover. For this reason, the portion, which is enclosed with the cover and the second receiving recess, remains as only an unused space. As a result, there is the problem that a useless space is generated in the inside of the base unit, which is required being made compact.

SUMMARY OF THE INVENTION

An object of the present invention is to provide a portable electronic apparatus with unused space therein.

The other object of the present invention is to provide a portable electronic apparatus capable of operating for a long time and having expandable features According to the present invention, there is provided a portable electronic apparatus comprising a base unit having a keyboard, a display unit connected to the base unit, a first mounting recess formed in the base unit and having a first battery functioning as a drive power source detachably attached thereto, and a second mounting recess formed in the base unit and having either a second battery functioning as a drive power source or an optional component for expanding the function of the portable electronic apparatus.

According to the above structure, if the second battery is attached to the second mounting recess of the base unit, electric power is supplied to the apparatus from the two batteries. Due to this, as compared with the apparatus using one battery, the consumption of the battery decreases, and the apparatus can be driven by the dual battery for a longer period of time.

Moreover, an optional component can replace the second battery which is normally attached to the second mounting recess, so that the second mounting recess of the base unit does not remain as an unused space when a second battery is unnecessary Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 7 is a perspective view showing the second battery to be attached to the second mounting recess;

FIG. 8 is a perspective view showing the optional component to be attached to the second mounting recess;

DETAILED DESCRIPTION OF THE PREFERRED EMBODIMENTS

Figure 1:
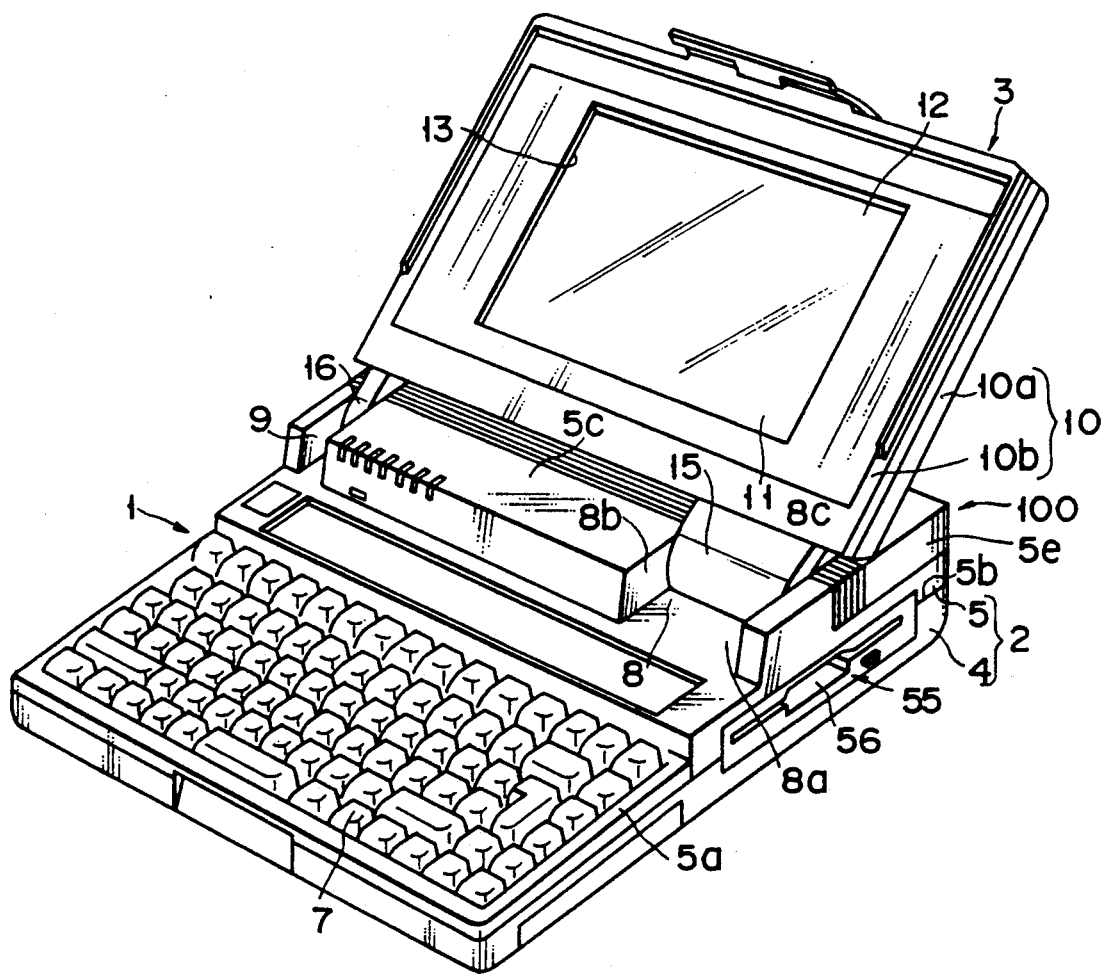
FIG. 1 is a perspective view of a portable computer relating to the present invention.

FIG. 1 shows a lap-top type portable computer 1. The portable computer 1 comprises a square and box-shaped base unit 2 and a flat panel type display unit 3. The base unit 2 comprises a bottom case 4 serving as a bottom plate and a top cover 5. A printed circuit board 6 is disposed in the base unit 2, and a number of circuit parts (not shown) are mounted on the printed circuit board 6.

The top cover 5 has a front portion 5a and a rear portion 5b. A keyboard 7 is attached to the front portion 5a of the top cover 5. The rear portion 5b of the top cover 5 expands upward than the keyboard 7. The rear portion 5b of the top cover 5 has an upper surface 5c, a rear surface 5d, which is continuous with the upper surface 5c, right and left side surfaces 5e, which are continuous with the upper surface 5c and the rear surface 5d. On the upper surface 5c of the rear portion 5b, there is formed a pair of mounting sections 8 and 9 to support the display unit 3.

Figure 2:
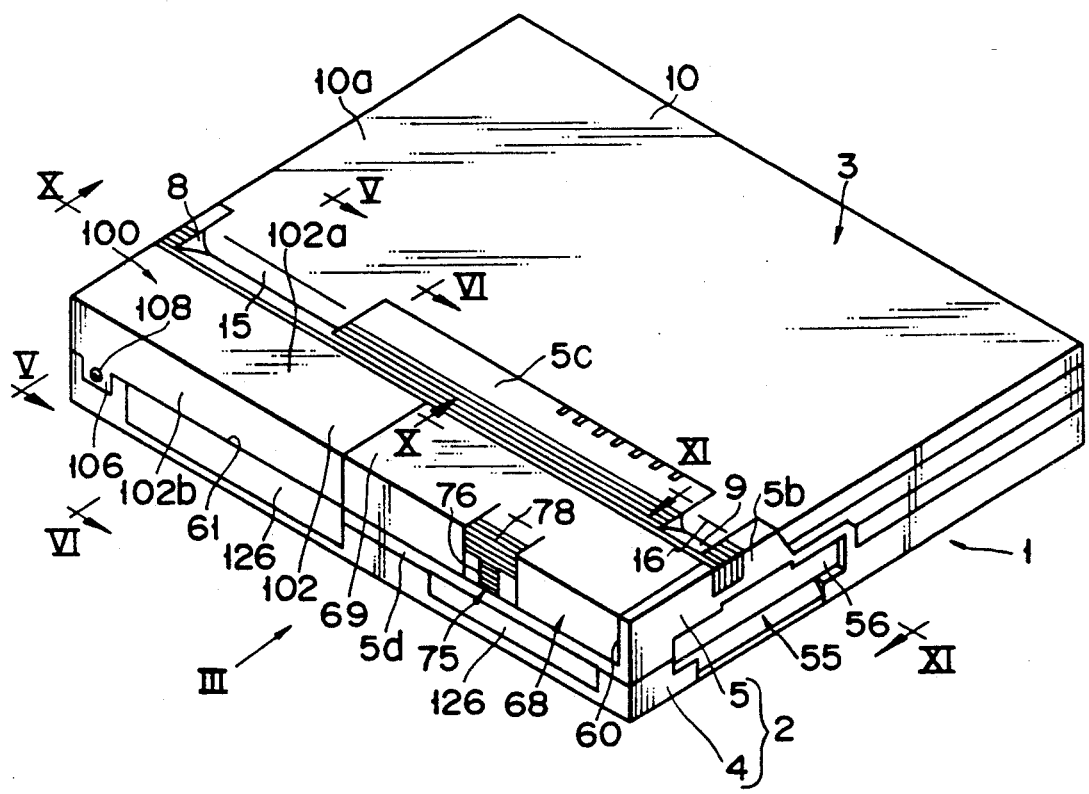
FIG. 2 is a perspective view of the portable computer showing a state that a display unit is rotated to a closed position where a keyboard is covered.
Figure 9:
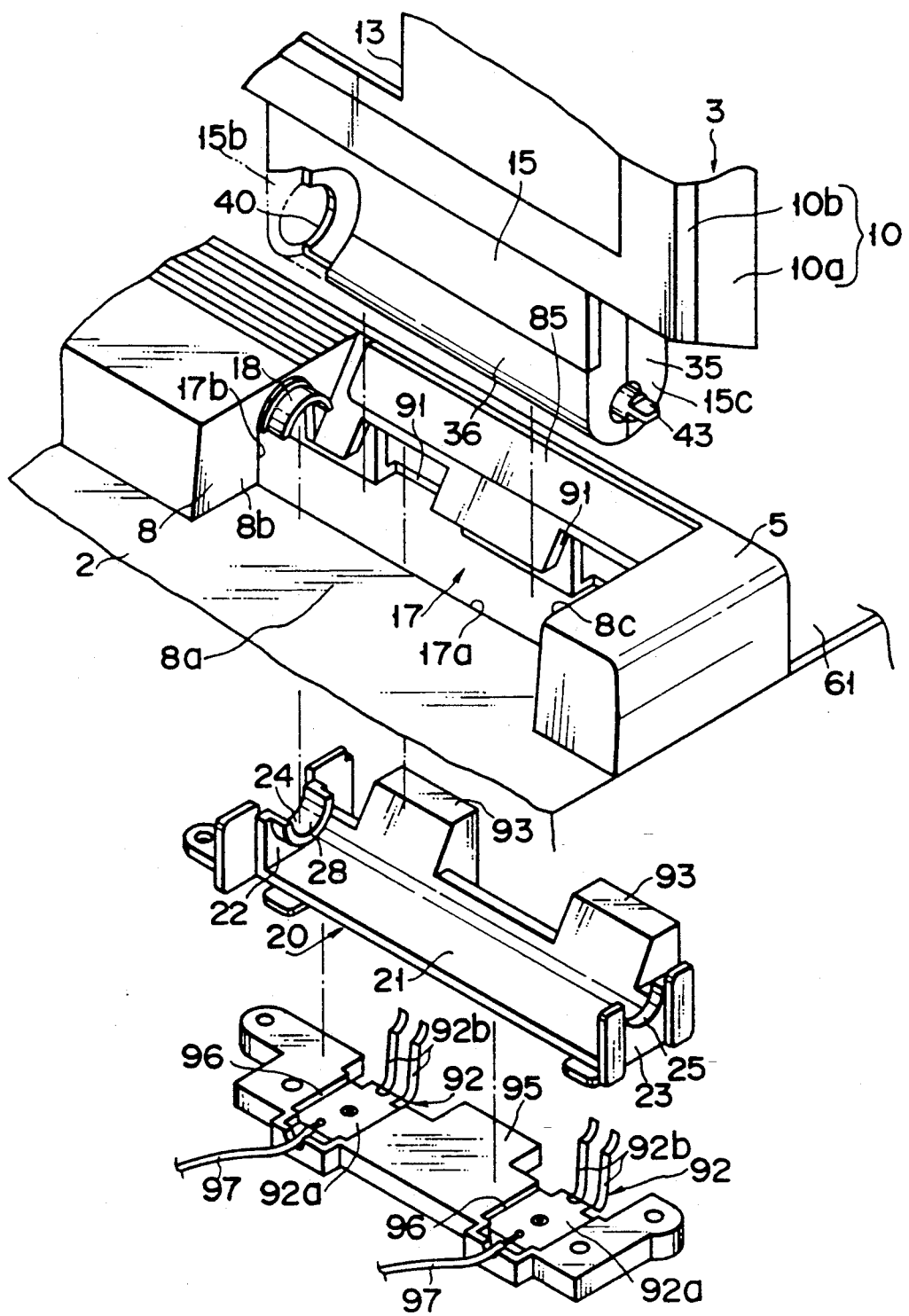
FIG. 9 is an exploded perspective view showing a connecting portion where the base unit of the portable computer of FIG. 1 is coupled to the display unit.

The display unit 3 comprises a housing 10, and a flat liquid crystal display 11. The housing 10 comprises a base panel 10a and a front panel 10b. The front panel 10b has an opening 13 by which a display screen 12 of the liquid crystal display 11 is exposed. In the housing 10, there are formed a first leg portion 15 and a second leg portion 16. These leg portions 15 and 16 are inserted into the leg mounting sections 8 and 9 of the top cover 5 and rotatably coupled to the leg mounting sections 8 and 9, respectively. By this coupling, the display unit 3 is rotated between the closed position at which the keyboard 7 is covered and the open position at which the keyboard 7 is exposed. As shown in FIG. 2, in a state that the display unit 3 is rotated to the closed position, the base panel 10a is formed in series to be flush with the upper surface 5c of the rear portion 5b. Thereby, the portable computer 1 is flat and box-shaped, and it is convenient for a person to carry the computer 1. As shown in FIGS. 1 and 9, one leg mounting section 8 where the first leg portion 1 of the display unit 3 is formed to be wider in the right and left directions than the other leg mounting section 9. The leg mounting section 8 has a bottom surface 8a, and right and left surfaces 8b and 8c, which are continuous with the bottom surface 8a. In the leg mounting section 8, there is formed an opening 17. The opening 17 comprises a bottom opening part 17a opening to the bottom surface 8a and side opening parts 17b and 17c opening to the right and left side surfaces 8b and 8c. The bottom opening part 17a and the side opening parts 17b and 17c are continuous with each other. The upper edge portions of the side opening parts 17b and 17c are shaped in a form of a circular arc. In the upper edge portion of the side opening part 17b on the left side, there is formed a semi-cylindrical guide portion 18. The guide portion 18 projects into the leg mounting section 8.

A cover 20 is attached to the top cover 5 to cover the opening 17 from the inside of the top cover 5. The cover 20 comprises a bottom wall 21 covering the bottom opening part 17a, and a pair of side walls 22 and 23 covering side opening parts 17b and 17c. In the upper edge portions of the side walls 22 and 23, there are formed receiving sections 24 and 25, which are cut in a form of a circular arc. The receiving sections 24 and 25 are opposed to the upper edge portions of the side opening parts 17b and 17c, and constitute circular through holes 26 and 27 opening into the top cover 5 in cooperation with the side opening parts 17b and 17c. In the receiving section 24 on the left side, there is formed a semi-cylindrical guide portion 28. The guide portion 28 is confront with the guide portion 18 of the side opening part 17b, thereby forming a hollow shaft 30 having a guide passage 29 in the left side surface 8b of the leg mounting section 8. The guide passage 29 leads to the through hole 26, and the inside of the base unit 2 and the leg mounting section 8 communicate through the through hole 26.

The other leg mounting section 9 of the base unit 2 has a bottom surface 9a and right and left side surfaces 9b and 9c, which are continuous with the bottom surface 9a. In the right side surface 9c of the leg mounting section 9, there is formed a through hole 32 opening into the top cover 5.

The leg portions 15 and 16 of the display unit 3 comprise a rear leg segment 35 and a front leg segment 36, respectively. The rear leg segment 35 is integrally extended from the base panel 10a of the housing 10, and the front leg segment 36 is integrally extended from the front panel 10b of the housing 10. The leg segments 35 and 36 are coupled to each other, and a cable passage 37 leading to the housing 10 is formed between the leg segments 35 and 36. The first leg portion 15 has opposing surfaces 15b and 15c opposing to the right and left side surfaces 8b and 8c of the leg mounting section 8. In the surface 15b on the left side, a rotation hole 40 is formed. The rotation hole 40 is rotatably inserted into the outer periphery of the hollow shaft 30, and the guide passage 29 and the cable passage 37 in the first leg portion 15 are communicated through the rotation hole 40.

Figure 10:
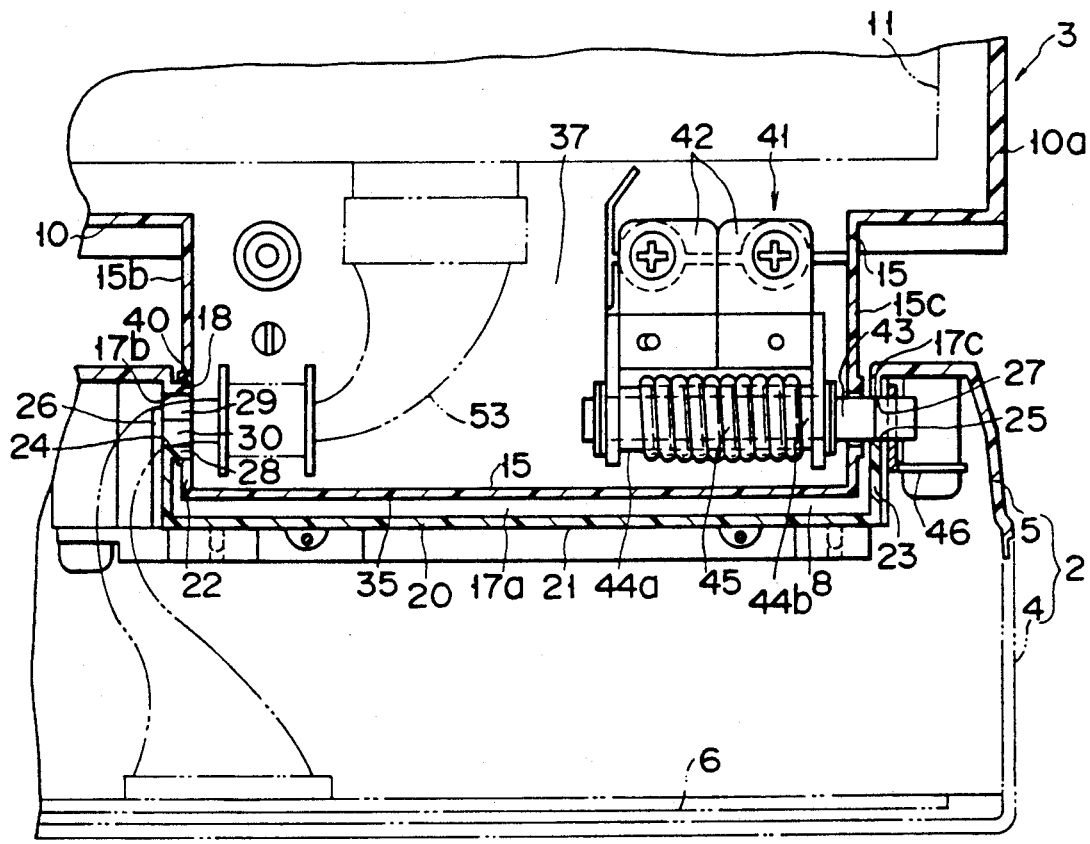
FIG. 10 is a cross sectional view taken along lines X—X in FIG. 2 showing a connecting portion where a first leg portion of the display unit is connected to a first mounting section of the base unit.

As shown in FIG. 10, the first leg portion 15 inserted into the leg mounting section 8 is coupled to the top cover 5 by a first hinge brake mechanism 41. The first hinge brake mechanism 41 is contained in the cable passage 37 of the first leg portion 15, and positioned on the side opposite to the first rotation hole 40. The first hinge brake mechanism 41 comprises a pair of brackets 42 fixed to the rear leg segment 35. In the brackets 42, a hinge shaft 43 is supported. The hinge shaft 43 is coaxial with the hollow shaft 30. On the outer periphery of the hinge shaft 43, a pair of sleeves 44a and 44b are rotatably mounted. The sleeves 44a and 44b rotate with the bracket 42 on the hinge shaft 43. A coil spring 45 is wound around the outer periphery of the sleeves 44a and 44b. One end of the hinge shaft 43 passes through the right opposing surface 15c of the first leg portion 15 and the through hole 27 of the right side surface 8c of the mounting section 8, and leads to the top cover 5. One end of the hinge shaft 43 is engaged with a metal fitting 46. The metal fitting 46 is fixed to the inside of the top cover 5 and stops the rotation of the hinge shaft 43. Due to this, if the display unit 3 is rotated to the open position from the closed position, the sleeves 44a and 44b rotate around the outer periphery of the hinge shaft 43. For this reason, one sleeve 44a rotates in a direction where the coil spring 45 is wound and tightened and the other sleeve 44b rotates in a direction where the coil spring 45 is loosened. By this rotation, the coil spring 45 is tightly wound around the outer periphery surface of the other sleeve 44a, thereby large frictional force is generated therebetween. Conversely, if the display unit 3 is rotated to the closed position from the open position, the other sleeve 45b rotates in a direction where the coil spring 45 is wound and tightened. By this rotation, the coil spring 45 is tightly wound around the outer periphery of the other sleeve 44b, thereby large frictional force is generated therebetween. Therefore, the free rotation of the display unit 3 is controlled, and the display unit 3 is maintained at an arbitrarily position between the closed position and the open position.

Figure 11:
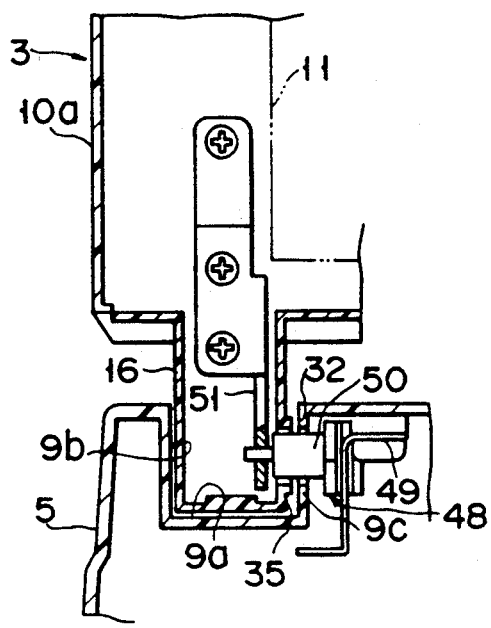
FIG. 11 is a cross sectional view taken along lines XI—XI in FIG. 2 showing a connecting portion where a second leg portion of the display unit is connected to a second mounting section of the base unit.

As shown in FIG. 11, the second leg portion 16 inserted into the leg mounting section 9 is rotatably coupled to the top cover 5 by a second hinge brake mechanism 48. The second hinge brake mechanism 48 comprises a bracket 49 fixed to the top cover 5 and a hinge shaft 50, which is rotatably supported by the bracket 49. The hinge shaft 50 passes through a through hole 32 of the right side surface 9c and leads to the inside of the second leg portion 16. A metal fitting 51 is fixed to the inside of the second leg portion 16. The metal fitting 51 is engaged with the hinge shaft 50. By this engagement, the hinge shaft 50 and the second leg portion 16 are rotatably coupled to each other.

The printed circuit board 6 in the base unit 2 and the liquid crystal display 11 in the display unit 3 are electrically connected through a cable 53. The cable 53 passes through the through hole 26 of the leg mounting section 8 and the guide passage 29 from the inside of the base unit 2. Further, the cable 53 passes through the rotation hole 40 of the first leg portion 15 from the guide passage 29, and leads to the cable passage 37 of the first leg portion 15.

Figure 6:
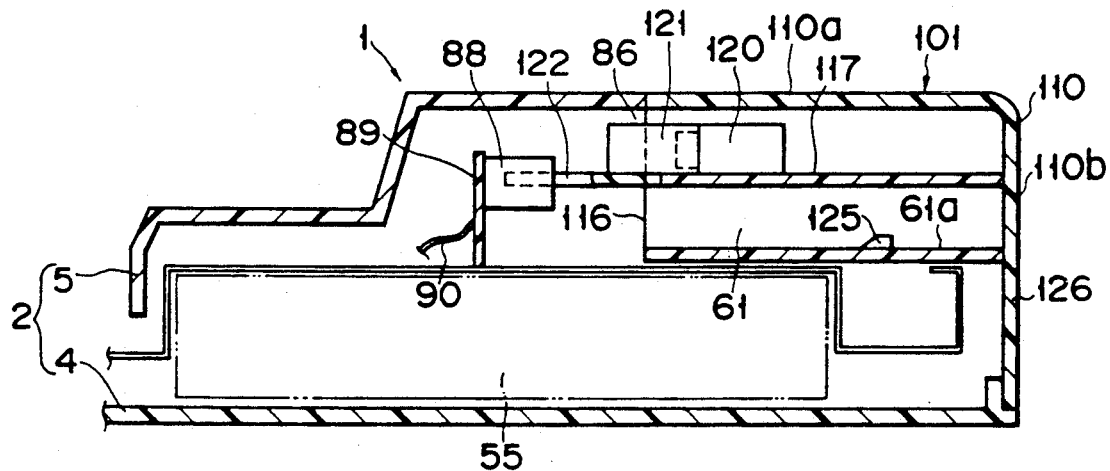
FIG. 6 is a cross sectional view taken along lines VI—VI in FIG. 2 showing that an optional component is attached to the second mounting recess of the base unit.

As shown in FIG. 6, a pair of floppy disc driving devices 55 is contained in the rear portion of the base unit 2. The floppy disc driving devices 55 are shaped flat and box-like, and arranged right and left on the bottom case 4 of the base unit 2 in parallel. The floppy disc driving devices 55 respectively have a floppy disc insertion inlet (not shown).

Figure 3:
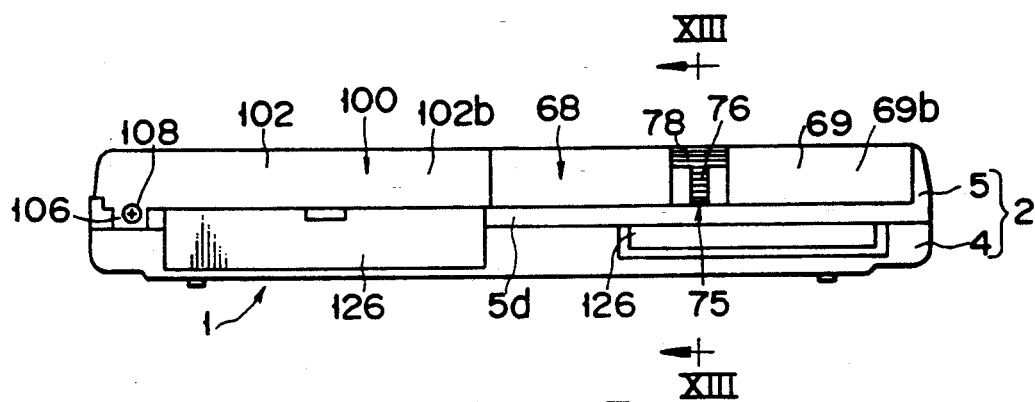
FIG. 3 is a perspective view of the portable computer seen from the direction of a line III of FIG. 2.
Figure 4:
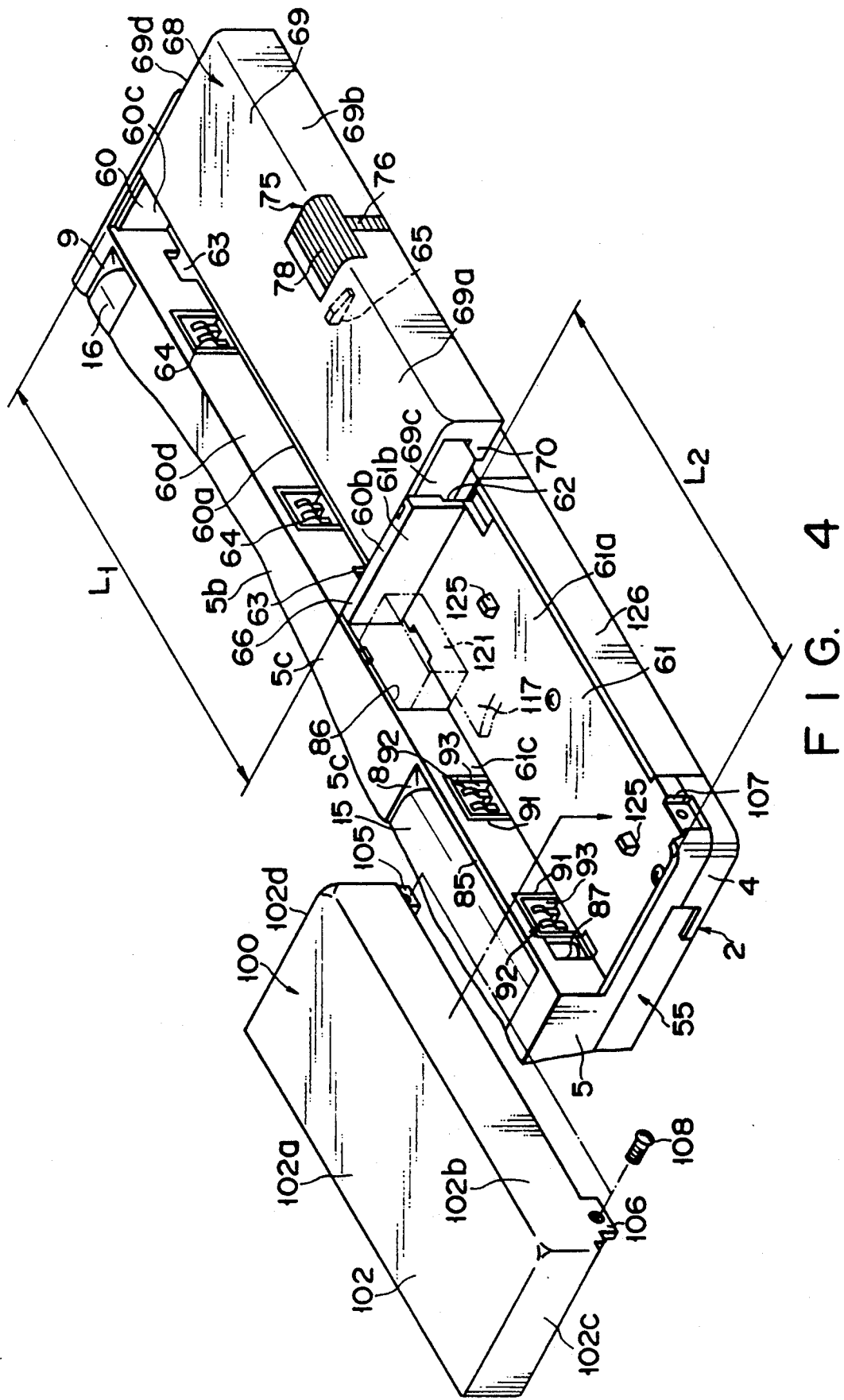
FIG. 4 is an exploded perspective view showing a state that first and second batteries are attached to first and second mounting recesses of a base unit.

As shown in FIGS. 2 to 4, in the rear portion of 5b of the top cover 5, there are formed a first mounting recess 60 and a second mounting recess 61. These first and second mounting recesses 60 and 61 are divided by a division wall 66 of the rear portion 5b. These first and second mounting recesses 60 and 61 are opened to the upper and rear surfaces 5c of the top cover 5. The length L1 of the first mounting recess 60 is formed to be longer than the length L2 of the second mounting recess 61. The first mounting recess 60 comprises a bottom surface 60a, right and left side surfaces 60b, 60c, which are continuous with the bottom surface 60a, and a front surface 60d, which is continuous with these surfaces 60a, 60b, and 60c. An engaging portion 62 is formed in each of the right and left side surfaces 60b and 60c. The engaging portion 62 is formed by cutting the lower portions of the rear ends of the side surfaces 60b and 60c. A pair of engaging holes 63 are formed in an angled portion made by the bottom surface 60a and the front surface 60d. The engaging holes 63 are spaced in the right and left directions. A pair of contact pieces 64 are formed in the front surface 60d of the first mounting recess 60. The contact pieces 64 are exposed to the first mounting recess 60 between the engaging holes 63, and electrically connected to the printed circuit board 6 in the base unit 2. Moreover, there is projected an engaging convex portion 65 in the central portion of the bottom surface 60a of the first mounting recess 60.

Figure 12:
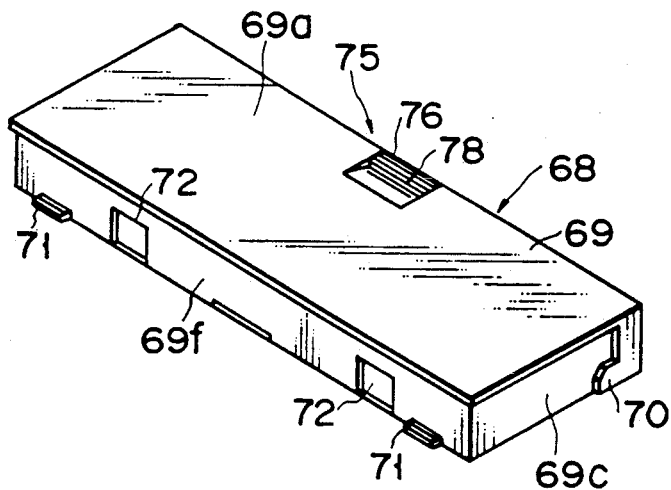
FIG. 12 is a perspective view showing the first battery to be attached to the first mounting recess of the base unit.

A rechargeable first battery 68 is detachably attached to the first mounting recess 60. More specifically, the first battery 68 is attached to the first mounting recess 60 from the backward portion of the base unit 2. The first battery 68 functions as a drive power source of the portable computer 1. As shown in FIGS. 4 and 12, the first battery 68 includes a box-shaped case 69. The case 69 has an upper surface 69a and a rear surface 69b, which are respectively made flush with the upper surface 5c of the top cover 5 and the rear surface 5d of the top cover 5 when the first battery 68 is attached to the first mounting recess 60. Due to this, the case 69 of the first battery 68 is continuous with the top cover 5, and constitutes a part of the top cover 5. Moreover, the case 69 has a side surfaces 69c, 69d opposing to the side surfaces 60b, 60c of the recess 60, a bottom surface 69e opposing to the bottom surface 60a of the recess 60, and a front surface 69f opposing the front surface 60d of the recess 60 when the first battery 68 is attached to the first mounting recess 60. In the side surfaces 69c and 69d of the case 69, there is projected an engaging projection 70, which is engaged with the engaging portion 62 of the first mounting recess 60. As shown in FIG. 12, in the front surfaces 69f of the case 69, there are projected a pair of engaging pieces 71 to be inserted into the engaging holes 63, and a positive and negative terminal plates 72 are exposed to the portion between the engaging pieces 71. The terminal plates 72 contacts a contact pieces 64 of the first mounting recess 60, thereby the first battery 68 is electrically connected to the portable computer 1.

Figure 13:
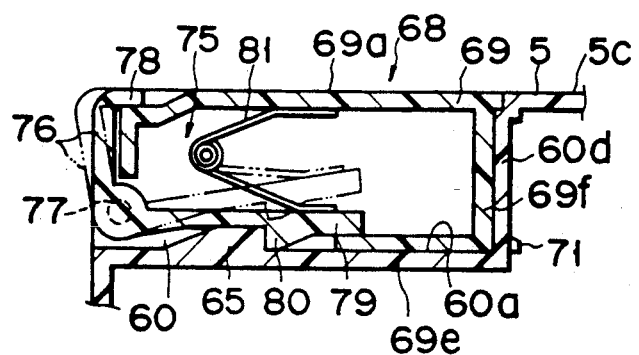
FIG. 13 is a cross sectional view taken along lines XIII—XIII in FIG. 3 showing a lock mechanism, which is incorporated into the first battery and is used to secure the battery to the first mounting recess of the base unit.

In the case 69 of the first battery 68, there is incorporated a fixing mechanism 75 for fixing the first battery 68 to the first mounting recess 60. As shown in FIG. 13, the fixing mechanism 75 comprises an operation lever 76 supported in the case 69. The operation lever 76 is rotatably supported by pivot shaft 77 in the case 69. The one end portion of the operation lever 76 forms a knob 78, which is exposed from the rear surface 69b of the case 69 to the upper surface 69a. The other end of the operation lever 76 forms an engaging arm portion 79, which is exposed to the bottom surface 69e of the case 69. The top end of the engaging arm portion 79 is engaged with the bottom surface 69e of the case 69 from the inner side, and has a claw 80 projecting downward. The claw 80 is engaged with the engaging convex portion 65 when the first battery 68 is inserted into the first mounting recess 60. Then, the engaging arm portion 79 of the operation lever 76 is always pressed downward by a torsion coil spring 81.

If the first battery 68 is inserted into the first mounting recess from the backward portion of the base unit 2, the engaging projection 70 of the case 69 is engaged with the engaging portion 62, and the engaging piece 71 is inserted into the engaging hole 63. Due to this, the movement of the first battery in the up and down and the right and left is restricted, and the terminal plate 72 contacts the contact pieces 64. By the insertion of the first battery 68, as shown by two dotted chain line of FIG. 13, the claw 80 of the operation lever 76 rides on the engaging convex portion 65 and the operation lever 76 is rotated against spring force of the torsion coil spring 81. If the first battery 68 is completely inserted into the first mounting recess 60, the claw 80 rides past the engaging convex portion 65, and the operation lever 76 is pressed back downward by spring force of the torsion coil spring 81. Due to this, the claw 80 is engaged with the engaging convex portion 65, and the first battery 68 is fixed to the first mounting recess 60 to prevent from being detached.

In order to detach the first battery 68 from the first mounting recess 60, the knob 78 of the operation lever 76 is pressed with a tip of a finger, and the operation lever 76 is rotated toward the back portion of the first battery 68. Thereby, the claw 80 of the operation lever 76 is detached from the engaging convex portion 65 and the first battery 68, which is fixed to the first mounting recess 60 by the fixing mechanism 75, is released, and the first battery 68 can be pulled out toward the back portion of the base unit 2.

As shown in FIG. 4, the second mounting recess 61 comprises a bottom surface 61a, a side surface 61b, which is continuous with the bottom surface 61a, and a front surface 61c, which is continuous with these surfaces 61a and 61b. Due to this, the second mounting recess 61 is opened to the upper surface 5c, the rear surface 5d, and the side surface 5e of the top cover 5. The second mounting recess 61 is positioned proximate to the leg mounting section 8. A portion of the front surface 61c of the second mounting recess 61 is formed by a dividing wall 85 dividing the portion between the second mounting recess 61 and the leg mounting section 8. In the front surface 61c of the second recess 61, there are formed a connector insertion hole 86, which opens into the top cover 5, and an engaging hole 87. The connector insertion hole 86 and the engaging hole 87 are spaced in the right and left directions of the second mounting recess 61. As shown in FIG. 6, a first connector 88 is arranged in a top cover 5. The first connector 88 is formed at the position opposing to the connector insertion hole 86. The first connector 88 is supported by a printed circuit board 89. The printed circuit board 89 is electrically connected to the printed circuit board 6 (FIG. 10) through a cable 90.

Figure 5:
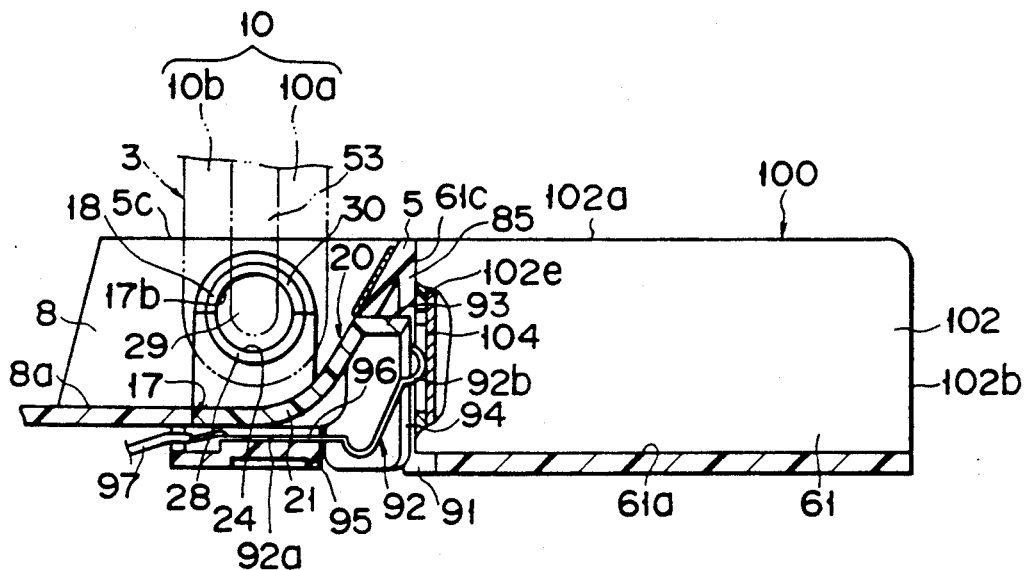
FIG. 5 is a cross sectional view taken along lines V—V in FIG. 2 showing that the second battery is attached to the second mounting recess of the base unit.

As shown in FIG. 4, a pair of through holes 91 opening into the top cover 5 is formed in the front surface 61c of the second mounting recess 61. The through holes 91 are arranged right and left in parallel to be placed at the portion between the connector insertion hole 86 and the engaging hole 87. A contact piece 92 is arranged in each through hole 91. As shown in FIGS. 5 and 9, the contact piece 92 is supported by the cover 20 covering the opening 17. The structure of supporting the contact piece 92 will be explained as follows:

In the bottom wall 21 of the cover 20, there is a pair of box sections 93, which are fitted into the through holes 91. The box sections 93 having an opening 94, which are opening into the second mounting recess 61 and the inside of the top cover 5. A supporting plate 95 is overlay on the bottom wall 21 of the cover 20. In the surface where the supporting plate 95 and the bottom wall 21 are overlay, a pair of attaching concave portions 96 is formed. The attaching concave portions 96 are continuous with the opening 94 of the box section 93, and the contact piece 92 is supported by the attaching concave portions 96. The contact piece 92 comprises a base portion 92a, which is fixed to the attaching concave portion 96, and a curved piece 92b, which extends to the box section 93 from the base portion 92a. The base portion 92a is electrically connected to the printed circuit board 6 through a lead wire 97. The curved piece 92b is exposed to the second mounting recess 61 through the through hole 91.

As shown in FIGS. 5 and 6, a rechargeable second battery 100 or a modem device 101 as an optional component is detachably attached to the second mounting recess 61. The second battery 100 functions as a drive power source of the portable computer 1 similar to the first battery 68. The second battery 100 is attached to the second mounting recess 61 from the upward portion of the base unit 2. The second battery 100 includes a box-shaped case 102. The case 102 has an upper surface 102a, a rear surface 102b and a side surface 102c, (see FIG. 4) which are respectively made flush with the upper surface 5c of the top cover 5, the rear surface 5d of the top cover 5 and the side surface 5e of the top cover 5 when the second battery 100 is attached to the second mounting recess 61. Due to this, the case 102 of the second battery 100 is continuous with the top cover 5, and constitutes a part of the top cover 5. Moreover, the case 102 has a second side surface 102d opposing to the side surface 61b of the second mounting recess 61, and a front surface 102e opposing to the front surface 61c of the second mounting recess 61 when the second battery 100 is attached to the second mounting recess 61. In the front surface 102e of the case 102, there is projected an engaging projection 103, (see FIG. 7) which is inserted into the engaging hole 87 of the second mounting recess 61. A positive and negative terminal plates 104 are exposed to the portion adjacent to the engaging projection 103. As shown in FIG. 5, the terminal plates 104 contact pieces 92 of the second mounting recess 61, thereby the second battery 100 is electrically connected to the portable computer 1. In the second surface 102d of the case 100, there is formed a bracket 105 extending downward. The bracket 105 passes through the bottom surface 61a of the second mounting recess 61 and is inserted into the bottom case 4, and the lower end of the bracket 105 is screwed to the bottom case 4 as shown in FIG. 4. An attaching piece 106 is formed in the rear surface 102b of the case 102. The attaching piece 106 is inserted into an attaching concave portion 107 of the rear surface 5d of the top cover 5, and fixed thereto by screw 108. Due to this, the second battery 100 is fixed to the second mounting recess 61 by two screws 108.

As shown in FIG. 6, modem device 101 has a built-in modem card, which is connected to a telephone line, (not shown) and includes a box-shaped modem case 110 as shown in FIG. 8. The shape of the modem case 110 is the same as that the second battery 100 of the case 102. The modem case 110 has an upper surface 110a, a rear surface 110b and a side surface 110c, which are respectively made flush with the upper surface 5c of the top cover 5, the rear surface 5d of the top cover 5 and the side surface 5e of the top cover 5 when the modem device 101 is attached to the second mounting recess 61 as illustrated in FIG. 6. Due to this, the modem case 110 of the modem device 101 is continuous with the top cover 5, and constitutes a part of the top cover 5. Moreover, the modem case 110 has a second side surface 110d opposing to the side surface 61b of the second mounting recess 61, and a front surface 110e opposing to the front surface 61c of the second mounting recess 61 when the modem device 101 is attached to the second mounting recess 61. In the second surface 110d of the modem case 110, there is formed a bracket 111 extending downward. The bracket 111 passes through the bottom surface 61a of the second mounting recess 61 and is inserted into the bottom case 4, and the lower end of the bracket 111 is screwed to the bottom case 4. An attaching piece (not shown), which is similar to the second battery 100, is formed in the rear surface 110b of the modem case 110. The attaching piece is fixed to the attaching concave portion 107 of the rear surface 5d of the top cover 5 by the screw 108. Due to this, similar to the second battery 100, the modem device 101 is fixed to the second mounting recess 61 by two screws 108.

As shown in FIG. 8, an engaging projection 115, which is inserted into the engaging hole 87, is formed in the front surface 110e of the modem case 110. An opening 116, which opens into the modem case 110, is formed at the position adjacent to the engaging projection 115. The opening 116 leads to the connector insertion hole 86 of the second mounting recess 61 when the modem case 110 is fixed to the second mounting recess 61. As shown in FIG. 6, a printed circuit board 117 is contained in the modem case 110. On the printed circuit board 117, there is mounted various parts of a communication circuit (not shown). A second connector 120, which is electrically connected to the parts of the communication circuit, is attached to the printed circuit board 117. The second connector 120 is formed at the position opposing to the opening 116 of the modem case 110, and an adapter 121 is connected to thereto. The adapter 121 is used to electrically connect the first connector 88 to the second connector 120, and has a connection board 122 projecting from the opening 11 of the modem case 110. In a case where the modem device 101 is attached to the second mounting recess 61, the connection board 122 passes through the connector insertion hole 86 and enters the inside of the top cover 5, and detachably connected to the first connector 88.

As shown in FIG. 4, a pair of engaging projections 125 is formed in the bottom surface 61a of the second mounting recess 61. The engaging projections 125 are engaged with the bottom portion of the second battery 10 and the bottom portion of the modem device 101, and prevent the second battery 100 and the modem device 101 from being detached from the second mounting recess 61 when the screw 108 is detached. Additionally, in the rear surface of the base unit 2, there is attached a cap 126 covering a connector (not shown) for connecting an outer terminal.

In the above-arranged portable computer 1, first and second mounting recesses 60 and 61 are formed in the base unit 2, and the first battery 68, which functions as a drive power force for the portable computer 1, is attached to the first mounting recess 60. Then, either the second battery 100, which functions as a drive power source for the portable computer 1, or the modem device 101 is selectively attached to the second mounting recess 61 of the base unit 2 as required. If the second battery 100 is attached to the second mounting recess 61, electric power is supplied to the portable computer 1 from two batteries 68 and 100. Therefore, as compared with the case in which one battery is used as a drive power source, power is provided to the computer 1 from both of the batteries 68 and 100, and therefore, operating the time for the portable computer 1 can be longer.

The second battery 100 is normally attached to the second mounting recess 61, but the modem device 101 can replace the second battery 100 in the second process as desired. As a result, either the modem device 101 or the second battery 100 is always attached to the second mounting recess 61. Due to this, the second mounting recess 61 does not remain as an unused space. Therefore, the limited sized base unit 2 can be effectively used to improve the life of the batteries 68 and 100 or expand the operation of the portable computer 1.

In the above embodiment, the second battery 100 and the modem device 101 are fixed to the second mounting recess 61 by the screw. However, in place of the screw, similar to the first battery 68, the fixing mechanism 75 see FIG. 13 may be incorporated into the second battery 100 and the modem device 101.

Also, the portable electronic apparatus of the present invention is not limited to the portable computer and can be applied to the apparatus such as a word processor and the liquid crystal television.

Moreover, the optional component to be attached to the base unit is not limited to the modem device and an add-in memory can be used in place of the modem device.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable electronic apparatus receiving at least one of first and second batteries, said apparatus comprising:
   an optional component having a first connector disposed therein;
   a base unit having a first mounting recess therein disposed to receive said first battery and a second mounting recess therein disposed to selectably receive one of said second battery and said optional component, said optional component replacing said second battery in said second recess when said optional component is positioned in said second recess, said second mounting recess comprising at least one contact piece extending therefrom for contacting said second battery when said second battery is positioned therein and a front surface having a connector insertion hole therein, said connector insertion hole being disposed away from said at least one contact piece;
   a second connector disposed in said base unit, said first connector opposing said connector insertion hole when said optional component is positioned in said second mounting recess; and
   an adapter unit, detachably coupled to said first connector and projecting from said optional component, said adapter unit inserting into said connector insertion hole and coupling to said second connector when said optional component is positioned in said second mounting recess.

2. The portable electronic apparatus according to claim 1, wherein said second connector is in said base unit at a position opposing said connector insertion hole.

3. The portable electronic apparatus according to claim 2, wherein said optional component further comprises a rectangular case housing said first connector, said case having a second front surface opposing said front surface of the second mounting recess when said rotational component is positioned in said second mounting recess and an opening disposed therein, said adapter projecting from said opening.

4. The portable electronic apparatus according to claim 3, wherein said optional component further comprises a printed circuit board, disposed in said case, said first connector being coupled to said printed circuit board.

5. The portable electronic apparatus according to claim 2, wherein said adapter unit comprises an adapter, removably connecting to said first connector, and a connection board supported by said adapter, said connection board having an end portion projecting from said opening of said case, said end portion of said correction board inserting into said connector insertion hole and coupling to said second connector when said optional component is positioned in said second mounting recess.

6. A portable computer, comprising:

base unit comprising a front portion having a keyboard attached thereto and a rear portion having a first mounting recess and a second mounting recess therein, said first mounting recess having a first back surface, a first bottom surface integral with a portion of said first back surface, and at least one first contact piece disposed at said first back surface, said second mounting recess having a second back surface, a second bottom surface integral with a portion of said second back surface, at least one second contact piece disposed at said second back surface, a connector insertion hole formed proximate to said at least one second contact piece;

a first connector disposed in said base unit;

a first battery, detachably mounting in said first mounting recess, and comprising at least one first terminal plate, each of said at least one first terminal plate contacting a corresponding one of said at least one first contact piece when said first battery mounts in said first mounting recess;

a second battery, selectably detachably mounting in said second mounting recess, and comprising at least one second terminal plate, each of said at least one second terminal plate contacting a corresponding one of said at least one second contact piece when said second battery mounts in said second mounting recess;

an optional component, detachably and selectably mounting in said second mounting recess in place of said second battery, comprising a case having an opening therein opposing said connection insertion hole when said optional component mounts in said second mounting recess and a second connector disposed in said case opposing said opening; and an adapter detachably coupled to said second connector and having a portion projecting from said case through said opening, said portion inserting into said connector insertion hole and coupling to said first connector when said optional component mounts in said second mounting recess.

7. The portable computer according to claim 6, further comprising a screw, removably connecting to said base unit, for securing one of said second battery and said optional component in said second mounting recess, and wherein said second bottom surface of said second mounting recess comprises at least one engaging projection for engaging with said one of said second battery and said optional component to secure said one of said second battery and said optional component in said second mounting recess when said screw is disconnected from said base unit.

* * * * *